United States Patent
Blase et al.

(10) Patent No.: US 10,570,993 B2
(45) Date of Patent: Feb. 25, 2020

(54) CHAIN LINK AND HANDLING CHAIN HAVING A CHAIN LINK

(71) Applicant: igus GmbH, Cologne (DE)

(72) Inventors: Frank Blase, Bergisch Gladbach (DE); Georg Theiss, Cologne (DE)

(73) Assignee: IGUS GMBH, Cologne (DE)

(*) Notice: Subject to any disclaimer, the term of this patent is extended or adjusted under 35 U.S.C. 154(b) by 0 days.

(21) Appl. No.: 15/548,256

(22) PCT Filed: Feb. 1, 2016

(86) PCT No.: PCT/EP2016/052066
§ 371 (c)(1),
(2) Date: Aug. 2, 2017

(87) PCT Pub. No.: WO2016/124541
PCT Pub. Date: Aug. 11, 2016

(65) Prior Publication Data
US 2018/0031076 A1    Feb. 1, 2018

(30) Foreign Application Priority Data

Feb. 2, 2015  (DE) .................... 20 2015 100 479 U

(51) Int. Cl.
*F16G 13/16*     (2006.01)
*B65G 17/08*    (2006.01)
(Continued)

(52) U.S. Cl.
CPC ............. *F16G 13/16* (2013.01); *B65G 17/08* (2013.01); *B65G 17/12* (2013.01); *B65G 17/40* (2013.01); *B65G 17/42* (2013.01)

(58) Field of Classification Search
CPC .......... F16G 13/16; B65G 17/08; B65G 17/12; B65G 17/40; B65G 17/42
(Continued)

(56) References Cited

U.S. PATENT DOCUMENTS 3,160,024 A * 12/1964 Mojonnier .............. F16G 13/07
                                                                 198/850
3,628,834 A    12/1971 Anderson
5,174,439 A    12/1992 Spangler et al.
(Continued)

FOREIGN PATENT DOCUMENTS

CA     2788189      2/2013
DE    19856908      6/2000
(Continued)

OTHER PUBLICATIONS

English translation of International Search Report dated Apr. 29, 2016, received in corresponding PCT Application No. PCT/EP2016/052066.
(Continued)

*Primary Examiner* — William R Harp
(74) *Attorney, Agent, or Firm* — Grossman, Tucker, Perreault & Pfleger, PLLC

(57) ABSTRACT

A chain link for a handling chain and to the handling chain. The handling chain has a body consisting of a plurality of chain links, which adjoin each other in the longitudinal direction of the handling chain, wherein the chain links are connected to each other in the adjoining connection regions thereof in such a way that, in each case, the chain links can be pivoted about a first pivot axis extending in the transverse direction. The chain link is designed to form a hinge-joint connection with the joint partner, wherein the chain link has at least one connection region designed as a first connection region, said connection region being designed in such a way that the hinge-joint connection enables at least one further relative motion of the joint partners in addition to the pivoting about the first pivot axis.

18 Claims, 6 Drawing Sheets

(51) Int. Cl.
*B65G 17/12* (2006.01)
*B65G 17/42* (2006.01)
*B65G 17/40* (2006.01)

(58) Field of Classification Search
USPC .......................................................... 198/853
See application file for complete search history.

(56) References Cited

U.S. PATENT DOCUMENTS

| | | | |
|---|---|---|---|
| 6,811,023 B1 | 11/2004 | Christiana et al. | |
| 7,367,447 B1* | 5/2008 | Harrison | B65G 17/08 |
| | | | 198/850 |
| 9,254,962 B2 | 2/2016 | Studer | |
| 2003/0136456 A1 | 7/2003 | Blase | |
| 2005/0241924 A1* | 11/2005 | Damkjaer | B65G 17/08 |
| | | | 198/853 |
| 2008/0277248 A1 | 11/2008 | Damkjaer | |

FOREIGN PATENT DOCUMENTS

| | | |
|---|---|---|
| DE | 602004000621 | 9/2006 |
| DE | 102006044371 | 4/2007 |
| DE | 102012107697 | 2/2013 |
| EP | 1591382 | 11/2005 |
| WO | 2012/068691 | 5/2012 |
| WO | 2013/126288 | 8/2013 |

OTHER PUBLICATIONS

English translation of International Preliminary Report on Patentability dated Aug. 7, 2017, received in corresponding PCT Application No. PCT/EP2016/052066.

* cited by examiner

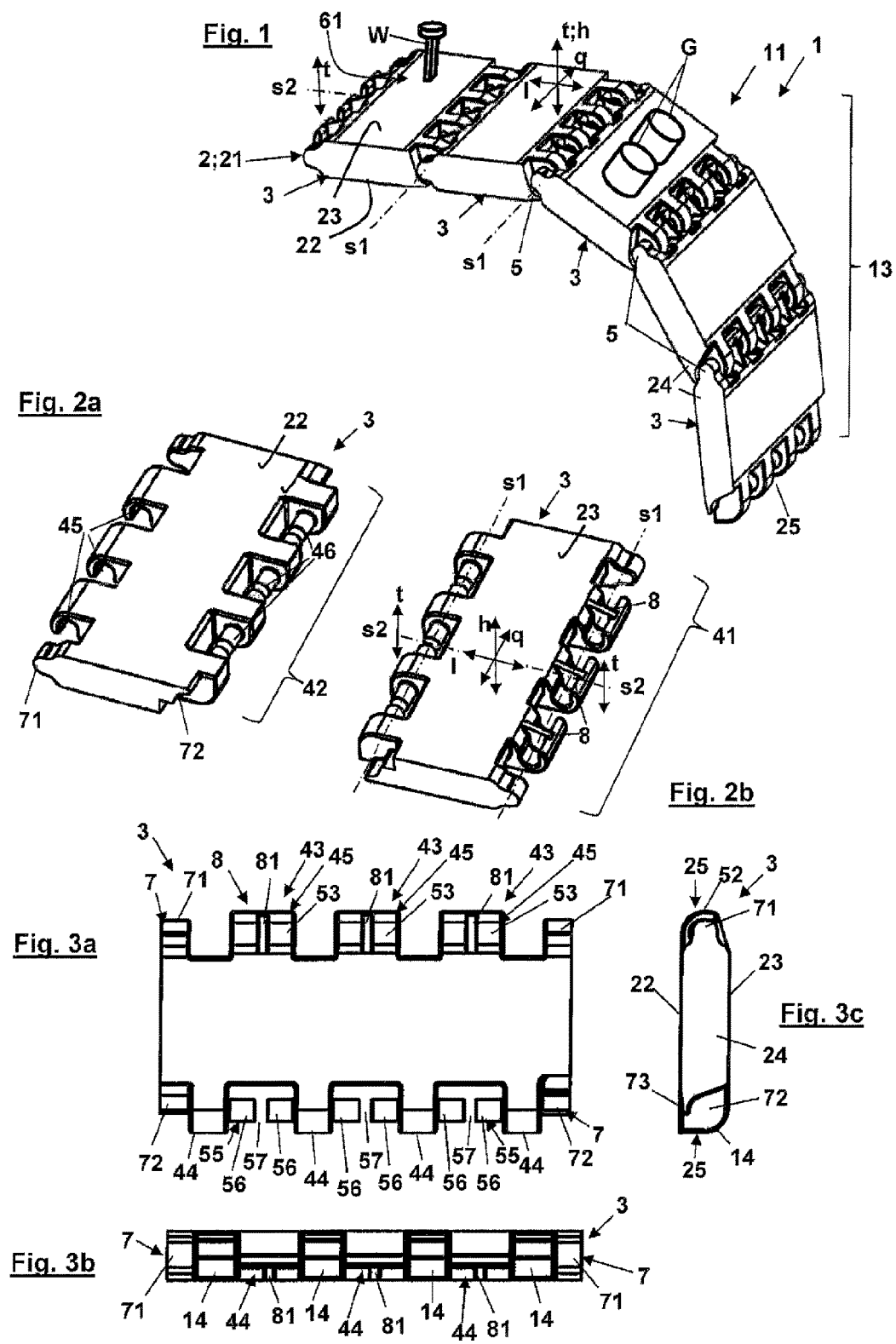

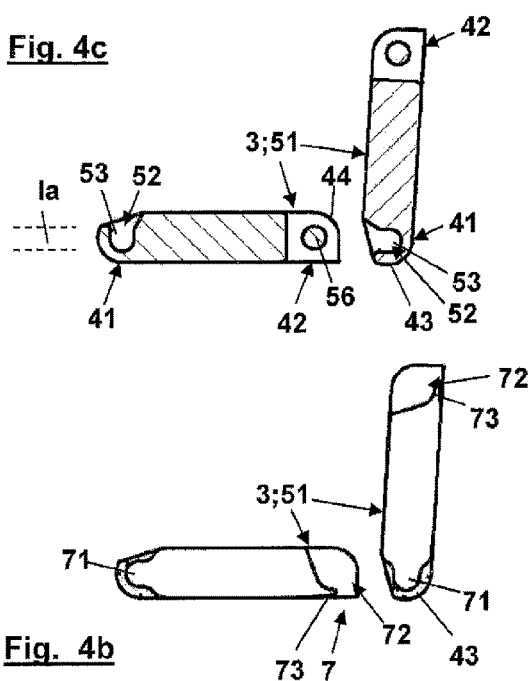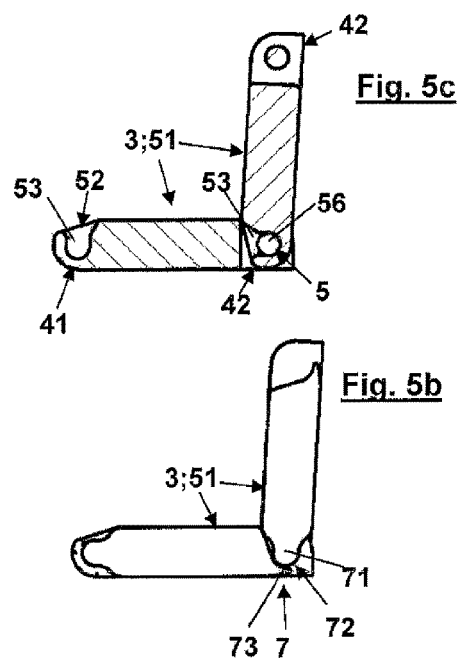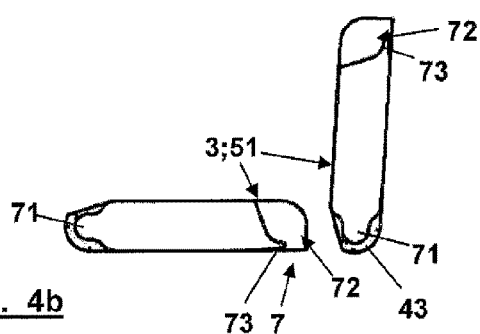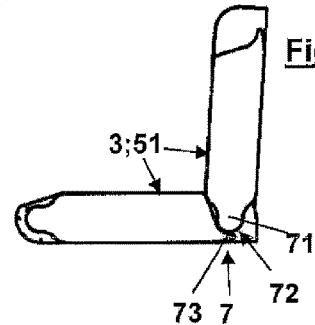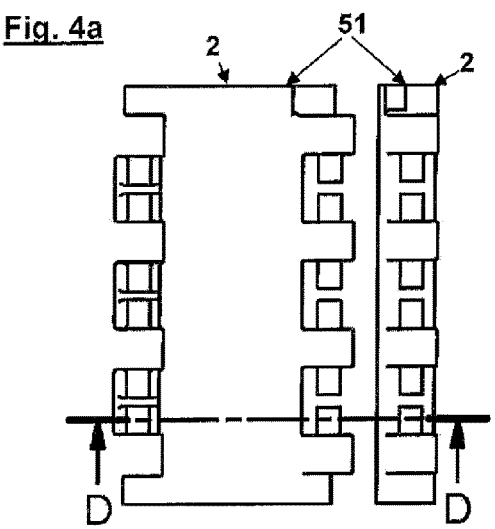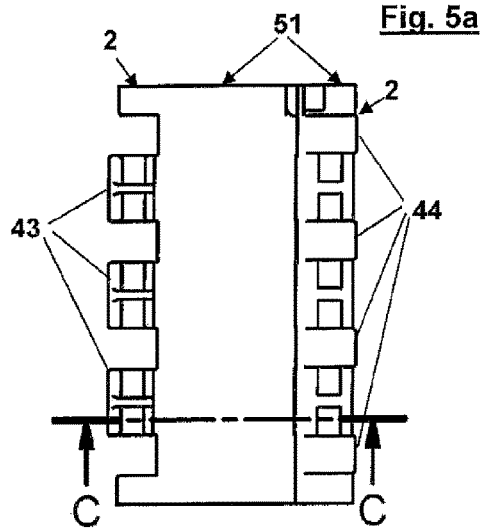

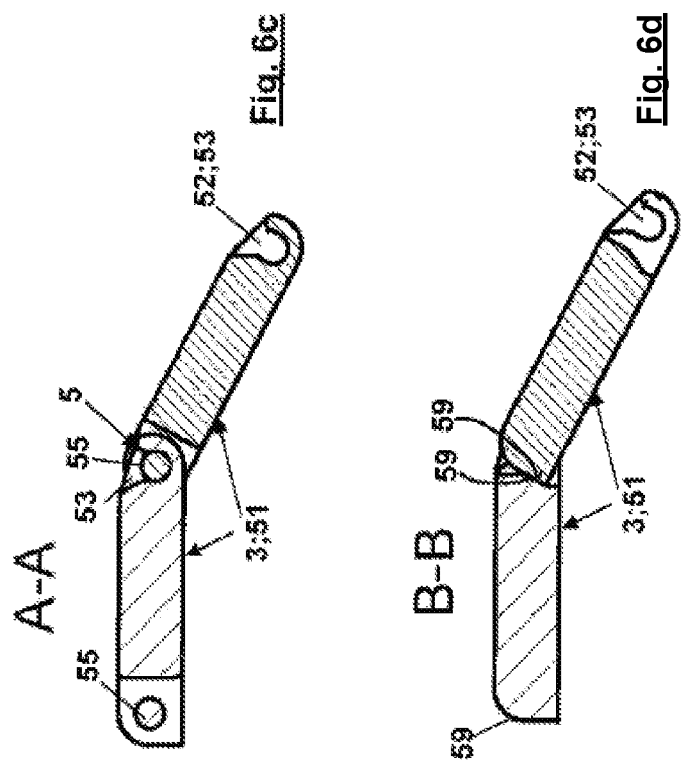
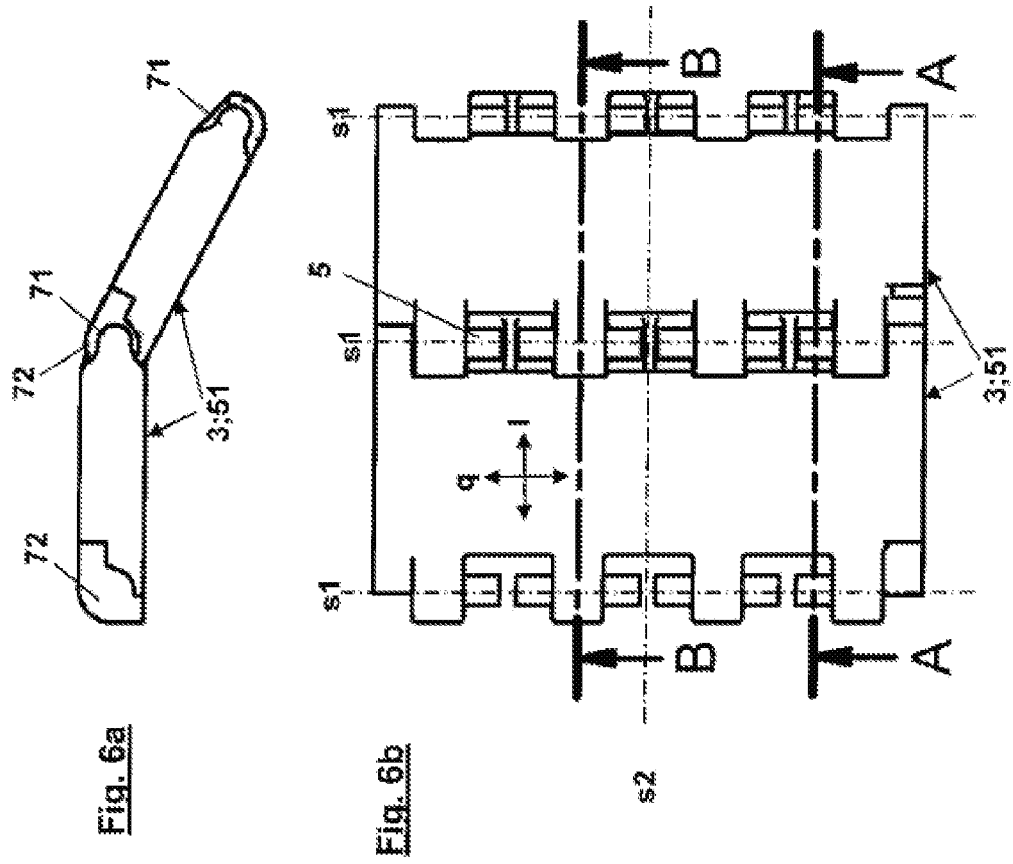

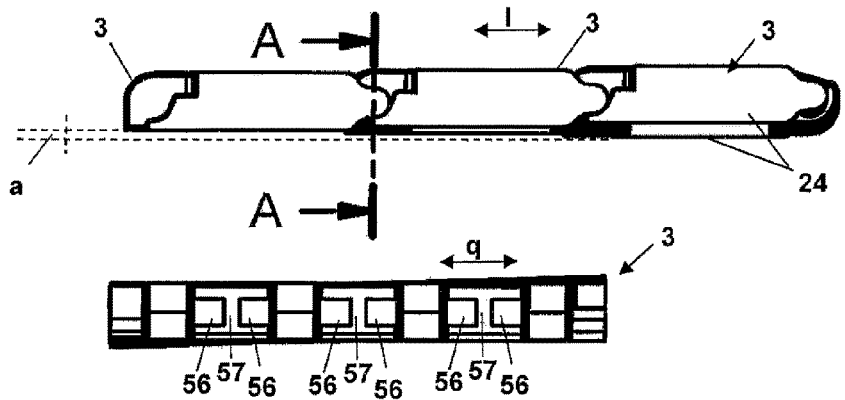
Fig. 7a
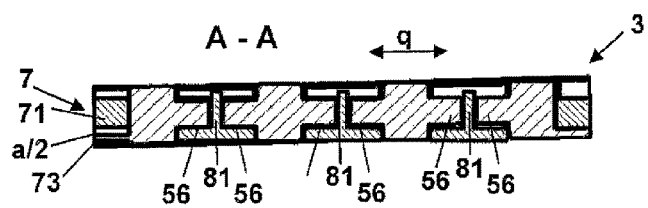
Fig. 7b
Fig. 7c
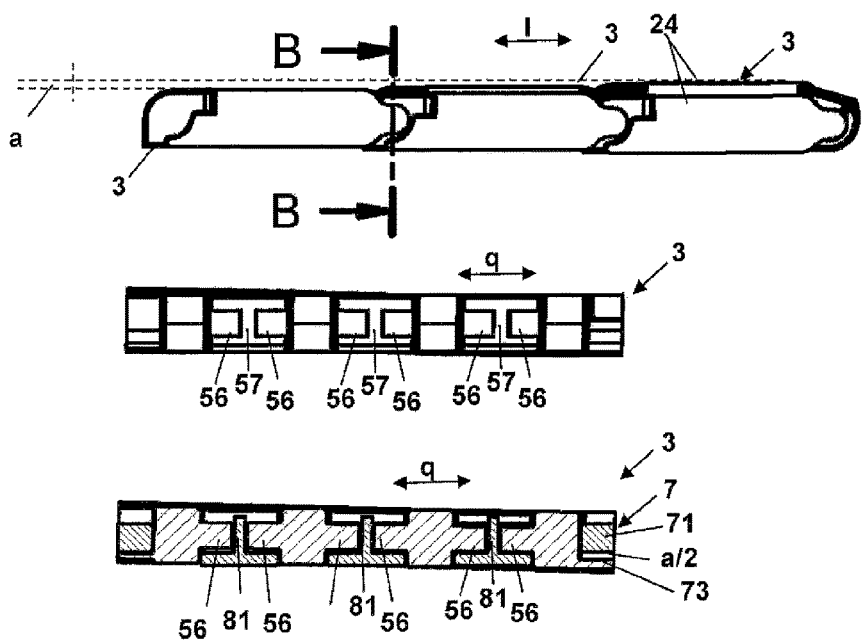
Fig. 8a
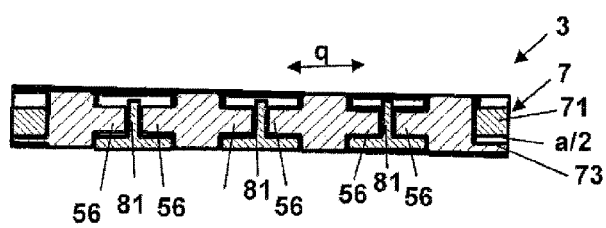
Fig. 8b
Fig. 8c

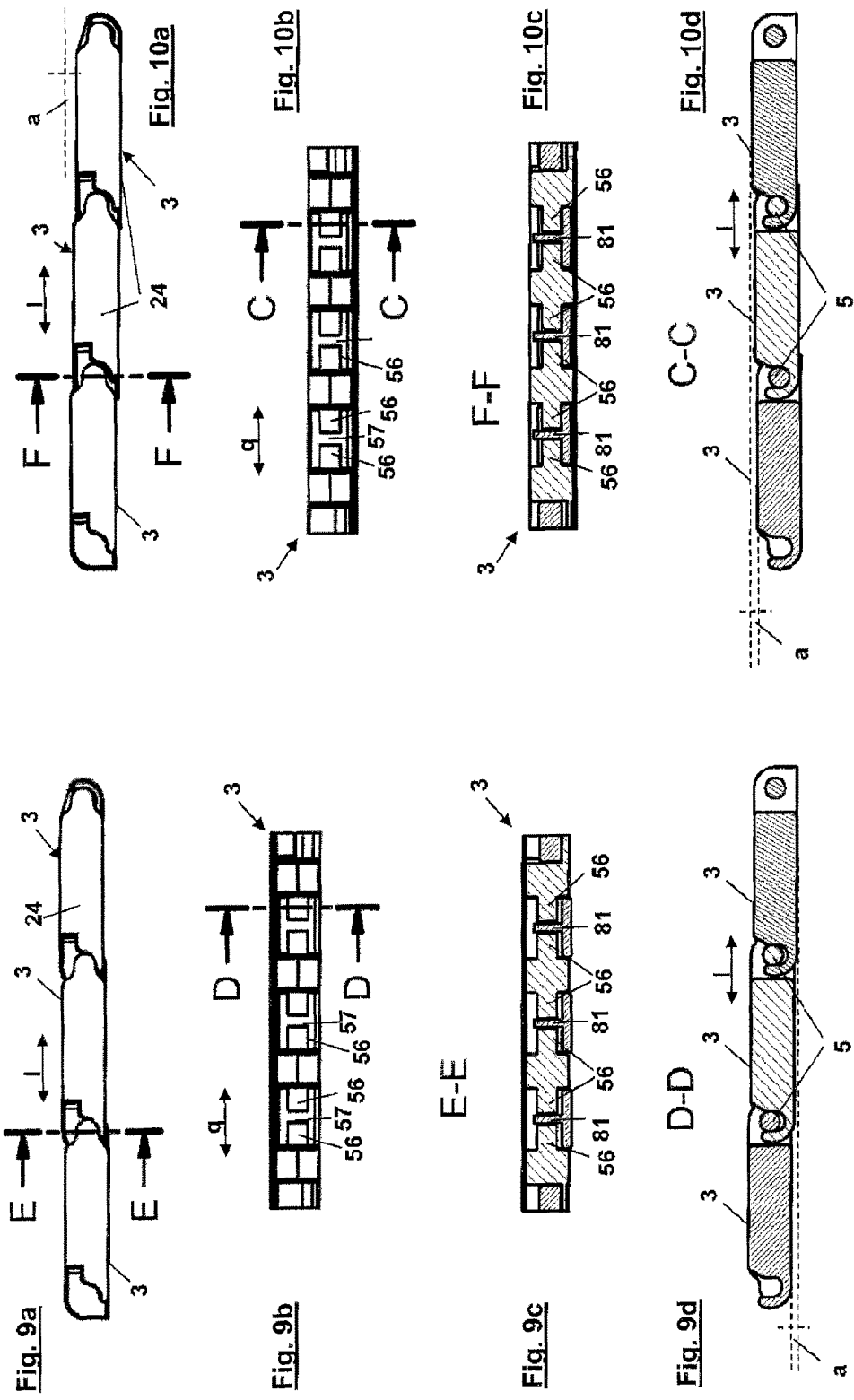

CHAIN LINK AND HANDLING CHAIN HAVING A CHAIN LINK

FIELD

The invention concerns a chain link for a handling chain, wherein the handling chain has a body composed of a plurality of chain links adjoining each other in the longitudinal direction of the handling chain and in their adjoining connecting regions the chain links are connected together pivotably about a respective first pivot axis extending in the transverse direction, wherein the chain link is adapted to form a pivotal connection in the form of a hinge joint connection with the respective joint partner and has at least one connecting region which is in the form of a first connecting region and which is so adapted that in addition to the pivotal movement about the first pivot axis the hinge joint connection permits at least one further relative movement of the joint partners. The invention further concerns a handling chain having such chain links.

BACKGROUND

The term handling chain is used to denote in particular a conveyor chain for transporting for example items or tools for carrying out a working operation or an energy guiding chain for carrying and guiding energy lines between two connection points which are moveable relative to each other, more specifically insofar as items or tools are conveyed to a given point or energy lines are guided to a given point by way of the handling chain. In particular the term handling chain is not used to denote a traction means chain for the transmission of rotary forces nor a jewelry chain or belt chain.

Good easy mobility of the body or the chain links making up the body are advantageous for easier displacement of the handling chain.

US 2008/277248 A1 describes a handling chain of the general kind set forth with chain links of the general kind stated. In that case the chain links have as a hinge joint opening in the one respective connecting region a slot extending in the longitudinal direction and in the other connecting region which is opposite in the longitudinal direction two pin portions spaced in the transverse direction by way of an intermediate space. In the installation position the pin portions engage in pairs laterally into the associated slot and are mounted displaceably in the longitudinal direction therein and permit a relative pivotal movement of the joint partners about a second pivot axis perpendicularly to the height direction and the transverse direction.

U.S. Pat. No. 5,174,439 A also discloses a handling chain of the general kind set forth with chain links of the stated general kind and connected together pivotably about a first pivot axis perpendicularly to the longitudinal direction. They are connected by means of hinge joint connections to hinge openings through which a hinge pin engages, wherein the joint partners in the hinge joint connection are additionally arranged displaceably relative to each other in the longitudinal direction and pivotably about a second pivot axis perpendicularly to the height direction and the transverse direction.

U.S. Pat. No. 3,628,824 A discloses a traction chain which is not of the general kind set forth, in which the chain links at their connecting regions are fitted into each other by way of a recess extending in the height direction and are moved into the hinge joint connection with a pivotal movement about the first pivot axis.

The handling chain described in US 2003/136456 A1 with chain links having side plates is also not of the general kind set forth. In this case elastically deformable regions for changing the length of the handling chain are provided in the side plates or in the hinge connections. That change in length occurs in the form of stretching or compressing of the elastically deformable regions which due to the construction involved represent a weak location in terms of the mechanical forces in respect of the tensile strength of the handling chain.

A further handling chain with chain links is described in DE 10 2012 107 697 A1, wherein the chain links are connected together by way of a cross joint having a first pivot axis in the transverse direction and a further pivot axis in the height direction.

An object of the invention is to provide a chain link of the general kind set forth and a handling chain of the general kind set forth having a body of pivotably interconnected chain links, affording improved pivotal mobility relative to the joint partner.

SUMMARY

The specified object is already attained in that the chain link is designed for a further relative movement of the joint partners of the hinge joint connection in the form of a pivotal movement of the joint partners about a second pivot axis extending in a longitudinal direction or in the form of a translation in a height direction, which extends perpendicularly or approximately perpendicularly to the longitudinal direction and the transverse direction of the joint partners.

Therefore, provided in the first connecting region are measures which permit a further relative movement of the joint partners and thus improved mobility thereof relative to each other. The chain link can be pivoted in the hinge joint connection with at least two degrees of freedom at the joint partners.

Preferably the first connecting region of the chain link is designed for a first additional relative movement of the joint partners in the form of a pivotal movement of the joint partners about a second pivot axis extending in the longitudinal direction or approximately in the longitudinal direction of the handling chain, that is to say at least substantially in the longitudinal direction.

Alternatively, or additionally, the first connecting region of the chain link can be designed for a second additional relative movement of the joint partners in the form of a translation of the joint partners. The translation can occur in particular perpendicularly to the longitudinal direction and transverse direction of the chain link or the handling chain. Thus, the translation movement can take place perpendicularly to a chain link plane. In regard to the pivot axes provided that translation movement can take place perpendicularly or approximately perpendicularly to the pivot axes, therefore at least substantially perpendicularly to the two pivot axes. The term translation of the one joint partner relative to the other joint partner is used to denote a displacement of the one joint partner relative to the other joint partner, in which all points of the one joint partner, that is to say the joint partner as a whole, are displaced relative to the other joint partner by an identical amount.

The hinge joint connection can have up to three degrees of freedom: pivotal movement about the first pivot axis, pivotal movement about the second pivot axis and translation perpendicularly to the pivot axes. By means of the hinge joint connection it is possible to achieve excellent guidance for the joint partners in the pivotal movement thereof about the first pivot axis and with the additional degree of freedom increased mobility of the joint partners relative to each other. As explained hereinafter it is possible, in comparison with the handling chain of the general kind set forth, to achieve tighter radii upon deflection of the handling chain around a direction-changing arc, and/or to overcome differences in height. In addition, torsional forces stressing the handling chain can be avoided in particular by the pivotal movement about the second pivot axis.

The body of the handling chain with the chain links according to the invention can be for example in the basic shape of a flat belt comprising hingedly interconnected chain links. The body can thus serve as a support, a "spinal column", for the handling chain. The belt can have peripheral narrow sides and opposite larger sides connecting same, that is to say a first side and a second side. The handling chain can be supported and/or guided in a handling chain arrangement at the first side on support and/or direction-changing rollers. In particular laterally on the body of the handling chain, there can be a transport space for the arrangement of the material to be transported and/or a guide space for receiving and guiding energy lines. Those spaces can be arranged at the first side and/or at the second side. The guide space can be provided at the first side and the transport space at the second side. The guide space can also be arranged in a guide passage which is provided in the body and which is preferably laterally openable.

By virtue of the at least one additional movement of the joint partners, in addition to the pivotal movement, relative to each other, they can be more easily adapted to the movement in order to compensate for example for detrimental tolerances. In addition, a tighter circular movement of the belt is possible upon deflection at the direction-changing roller. A reduction in the structural size is thus also possible. In addition, a rise in the handling chain over a given height perpendicularly to the longitudinal direction and the transverse direction by way of the relative translation of the joint partners in the height direction stepwise from chain link to chain link is made possible so that, depending on the degree of translation, there is no or a reduced angulation of the handling chain or the second side of the handling chain, that carries the transport space. In addition, the handling chain can be lifted with pivotal movement about the second pivot axis at a longitudinal side. As a result, the second side can function as an inclined plane at which the item arranged in the transport space can slip laterally from the transport chain.

Implementation of the translation movement can be afforded in a structurally simple fashion in that the first connecting region has a sliding guide means for guiding the associated joint partners. In that way the joint partners can be guided at or in the sliding guide means. Preferably the sliding guide means is designed for a purely linear translation movement of the joint partners relative to each other. That can be effected perpendicularly to the longitudinal and transverse direction of the joint partners.

In a structurally uncomplicated fashion the first connecting region of the chain link as the first connecting means can have at least one first hinge opening which is axial with respect to the first pivot axis, with an uncurved, that is to say linear, slot profile as the sliding guide means. That provides that a translation relative movement of the joint partners can take place in the slot. That translation movement occurs in the longitudinal extent of the slot profile. The extent of the slot profile determines the direction of the translation. As it is uncurved the translation is purely linear. The slot profile can extend perpendicularly to the pivot axes, that is to say axially in the height direction. The height direction can extend perpendicularly to the longitudinal direction and the transverse direction or perpendicularly to a chain link plane.

The joint partner can engage into the slot in such a way that in addition or instead of the translation, tilting of the joint partner in the slot becomes possible. Tilting can be in the form of a pivotal movement about the second pivot axis. As it occurs due to the tipping movement in the slot, it is perpendicular to the first pivot axis. In both cases, the pivotal movement about the second pivot axis and the translation movement in the slot, the respective joint partner can abut at the end in the slot profile to delimit its relative movement.

The chain link can have a plate-like body involving a thickness which is axial with respect to the height direction h and has the two larger side surfaces, wherein in the position of installation in the handling chain they form a portion of the first side and the second side of the handling chain. The first hinge opening can be arranged centrally relative to the thickness of the chain link or the handling chain. The longitudinal extent of the slot profile can be up to 95% of the thickness, in particular up to 90% of the thickness or about 85% of the thickness. The greater the proportion of the longitudinal extent in relation to thickness, the correspondingly greater is the possible mobility of the joint partners relative to each other.

The body of the chain link can be produced in one piece, in particular in the form of a plastic injection molding.

In a development of the chain link it can have a second connecting region spaced from the first connecting region in the longitudinal direction for providing the hinge joint connection with a further joint partner, more specifically at the first connecting region thereof, with the at least one first hinge opening. The second connecting region as the second connecting means can have at least one second hinge opening which is axial relative to the first pivot axis. That can be an at least substantially circular opening profile for receiving a hinge pin passed through the hinge openings of both joint partners.

Alternatively, it is possible to provide in the second connecting region as a second connecting means, at least one substantially round pin for engagement into the first hinge opening of the associated joint partner. That pin can be formed in one piece on the chain link. In this embodiment of the hinge joint connection therefore no further individual component part is required. The connecting regions can each be arranged at the end or in an end region of the respective chain link.

In a development of the chain link the at least one first hinge opening with the opening C-shaped profile, for stabilization thereof in relation to radial enlargement with respect to the first pivot axis, can have a reinforcement means. That can be in the form of a reinforcement wall which is arranged perpendicularly relative to the first pivot axis and which is connected laterally to the C-shaped profile. Thus, the reinforcement wall can receive from the C-shaped profile forces which are radial with respect to the first pivot axis. The reinforcement wall can advantageously centrally divide the first hinge opening perpendicularly to the first pivot axis.

Like the handling chain the sector-shaped body of the chain link can have a second side arranged perpendicularly to the height direction. That side can be in the form of a carrier of the portion of the transport space, that is associated with that chain link. It can delimit the transport space. It is possible to provide at the second side thereof means projecting therefrom in the height direction, in particular loop-shaped or arcuate holding means for receiving and guiding the material to be transported.

Preferably the C-shaped profile is of an opened configuration axially with respect to the height direction, more specifically in the direction of the surface normal facing away from the second side, or in the direction of the projecting means. Particularly when at least each second chain link of the handling chain has such holding means they can limit the pivotal movement of the chain links about the first pivot axis, by butting at the end laterally against each other. In that way, as described in greater detail hereinafter, in particular during storage and assembly of the handling chain, it is possible to prevent a chain link connected by way of the hinge joint connection from sliding out of the C-shaped profile.

The holding means can form an integral component together with the body. Preferably however the holding means can be subsequently fixed to the body. In that case the holding means can structurally vary depending on the respective demands involved for example in configuration and/or dimensioning. Admittedly but not necessarily each of the chain links in the handling chain can have the holding means. Preferably the chain links provided with holding means are arranged spaced equally over the handling chain length.

In a further development of the chain link it can be provided that, extending in the longitudinal direction away from the respective chain link, arranged in the first connecting region is at least a first projection with the first connecting means and arranged in the second connecting region is at least a second projection with the second connecting means. For improved mechanical stability of the hinge joint connection and for better guidance of the two joint partners relative to each other, it is possible to provide a plurality of first and second projections. Desirably in terms of force mechanics the number of first projections provided in the first connecting region can be smaller by one than the second projections in the second connecting region. The consequence of this is that in the installation position each first projection is axially flanked by two respective second projections.

In the installation position first hinge openings and second hinge openings or first hinge openings and the pin can be arranged in axially mutually aligned relationship with respect to the pivot axis. For easier pivotal movement of the chain links of the handling chain the projections can preferably be of a rounded configuration at their respective ends about the first pivot axis. In an embodiment of the chain link at least two projections in the form of first projections can be provided in the first connecting region and at least three projections in the form of second projections can be provided in the second connecting region. The projections can be arranged in axially mutually adjoining relationship and in an alternate sequence with respect to the first pivot axis. The projections of adjacent chain links can engage tooth-like into each other in the connecting position, wherein the hinge openings of the projections are arranged in axially aligned relationship with respect to the first pivot axis. The projections can be in axially non-displaceable lateral contact with respect to the first pivot axis.

For the situation where the second connecting means has at least one at least substantially round pin for engagement into the first hinge opening of the associated joint partner the pin can extend in the direction of the second pivot axis between two second projections. For the situation where the first hinge opening with the opening C-shaped profile for stabilization thereof in relation to radial enlargement with respect to the first pivot axis has a reinforcement wall arranged perpendicularly to the first pivot axis, the pin can be divided in the region of the reinforcement wall into two pin portions which respectively extend axially towards each other with a free end with respect to the first pivot axis to define an intermediate space for engagement of the reinforcement wall. The intermediate space can be of an axial size equal to the thickness of the reinforcement wall.

There can be provided a handling chain according to one of the embodiments described hereinbefore and hereinafter for transporting items in the longitudinal direction of the handling chain. The handling chain can have a body composed of a plurality of chain links in mutually adjoining relationship in the longitudinal direction of the handling chain, in accordance with one of the embodiments described hereinbefore and hereinafter. The chain links can be connected pivotably in mutually adjoining relationship in a respective hinge joint connection by way of a first pivot axis extending in the transverse direction. The body can be of a belt-like configuration.

The hinge joint connections of the chain links can each have a further degree of freedom in the form of an additional relative movement of the joint partners. The additional relative movement can be in the form of a pivotal movement of the joint partners about a second pivot axis extending in the longitudinal direction and/or in the form of a translation which is perpendicular to the handling chain plane or perpendicularly or approximately perpendicularly to the pivot axes.

As described hereinbefore adjacent chain links are respectively connected together by way of a first connecting region of the one joint partner and a second connecting region of the other joint partner. In a development of the handling chain the first connecting means of the chain links can have at least one first hinge opening which is axial with respect to the axis of rotation, with an at least substantially axially extending slot profile in the height direction and the second connecting means can have at least one second hinge opening which is at least substantially axial with respect to the transverse direction and which has a circular opening profile. In the hinge joint connection, the hinge openings are arranged in axially aligned relationship with respect to the first pivot axis and are held pivotably moveably relative to each other by means of a hinge pin passed through the hinge openings.

Alternatively, the first connecting means in the readiness position of the handling chain can have at least one first hinge opening which is axial with respect to the transverse direction and has a slot profile which extends at least substantially axially with respect to the height direction and which is in the form of a C-shaped profile opened in the height direction. The second connecting means can have at least one pin which is arranged at least substantially axially with respect to the first pivot axis and which engages through the first hinge opening in the connecting position.

For the situation where the first hinge opening which has the opening C-shaped profile, to connect two joint partners the first and second connecting means of the associated connecting regions of two joint partners in a joining position in which the joint partners are set at an angle around 90° can be moved above each other and brought into engagement with lateral engagement of the pin into the C-shaped profile of the first hinge opening. Then the two joint partners at the connecting means can be pivoted out of the joining position into a working position in which the joint partners are at an angle around 180°. The joint partners can be secured to prevent disengagement of the connection in the working position, in the joining position.

The handling chain can be in the form of a conveyor chain for transporting for example items or a tool for carrying out a working operation. That working operation can be for example periodically printing on a substrate like material or paper by means of a stamp as the tool. The conveyor chain can have a transport space for receiving the item, in which the tool can also be arranged. The handling chain can also be in the form of a guide chain for receiving and guiding supply lines like in particular energy lines between two connection points which are moveable relative to each other. The guide chain can have a guide space for guiding the supply lines. The two embodiments of the handling chain can be of the same or even identical structure in particular in regard to the chain links. They can but do not necessarily have to differ in regard to the nature and arrangement of the spaces for the arrangement of the item and/or the tool or in regard to guidance of the supply lines. Thus, the two embodiments of the handling chain can be respectively used in identical fashion.

BRIEF DESCRIPTION OF THE DRAWINGS

Without limiting the present invention thereto, it is described in greater detail hereinafter by means of a number of embodiments illustrated in a drawing of the chain link and the handling chain with chain links:

FIG. 1 shows a perspective view of a first embodiment of a handling chain in the form of a conveyor chain and more specifically a portion having a few chain links according to a first embodiment, with the omission of possible drives, support rollers and connections;

FIGS. 2a and 2b show a perspective view from below and a plan view of a chain link according to the first embodiment of FIG. 1;

FIGS. 3a through 3c each show a view of the chain link of FIG. 2;

FIGS. 4a through 4c, FIGS. 5a through 5c, and FIGS. 6a through 6d respectively show views and sectional views relating to the assembly of two chain links in three steps;

FIGS. 7a through 7c respectively show a view and a sectional view of three interconnected chain links in a first relative position with respect to each other;

FIGS. 8a through 8c respectively show a view and a sectional view of three interconnected chain links in a second relative position with respect to each other;

FIGS. 9a through 9d respectively show a view and a sectional view of three interconnected chain links in a third relative position with respect to each other;

FIGS. 10a through 10d respectively show a view and a sectional view of three interconnected chain links in a fourth relative position with respect to each other;

DETAILED DESCRIPTION

Figure 11:
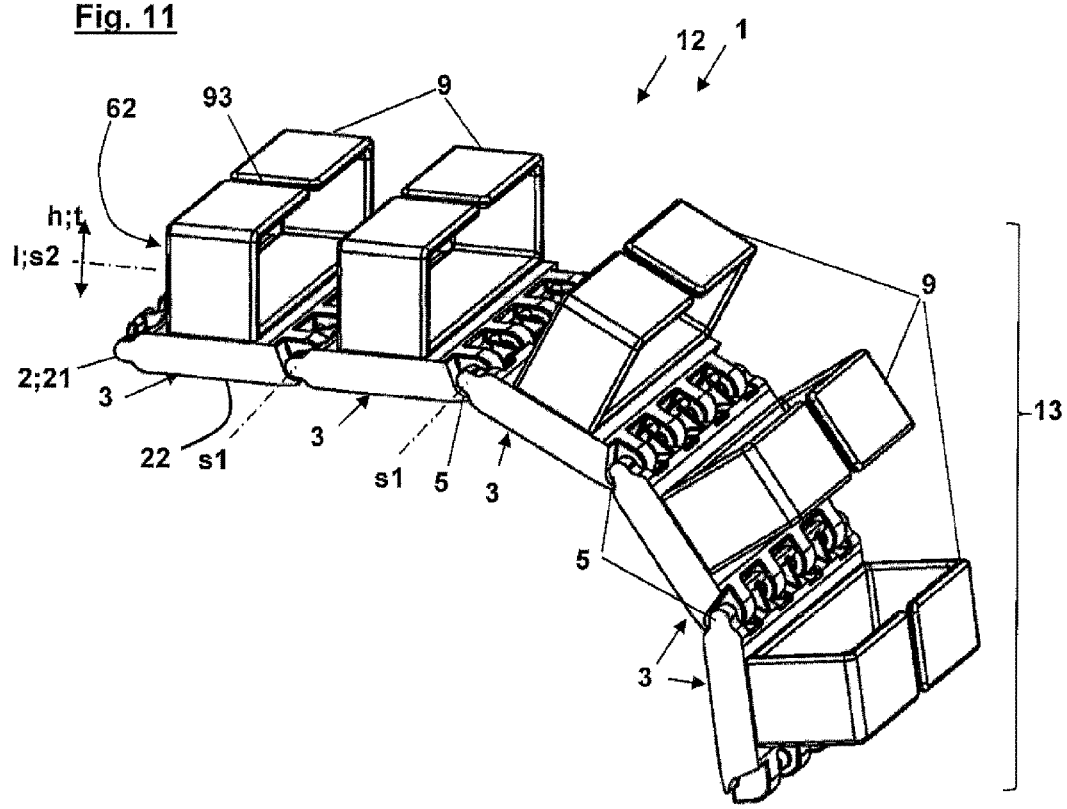
FIG. 11 shows a perspective view of a second embodiment of the handling chain in the form of an energy guiding chain and more specifically a portion with a few chain links according to a second embodiment with holding means, with the omission of possible connections and connection members.

FIGS. 1 and 11 respectively show an embodiment of a handling chain 1. The handling chain 1 is here of a belt-form configuration. Referring to FIG. 1 the handling chain 1 is in the form of a conveyor chain 11 for transporting for example items G or a tool W for carrying out a working operation (not shown further here), for example periodically printing on a substrate like material or paper, by means of a stamp S as the tool W. The tool W is fixed to the conveyor chain and can optionally be remotely controlled. Possible holding means for the items have not been illustrated here, for clearer representation of the invention.

In both cases the handling chain 1 has a flat body 2 which extends in the longitudinal direction 1 and which is composed of a plurality of here plate-shaped chain links 3 arranged in mutually adjoining relationship in the longitudinal direction 1. In their adjoining connecting regions 41, 42 the chain links 3 are connected pivotably to each other by way of a hinge joint connection 5 about a first pivot axis s1 which extends in the transverse direction q. As can be seen from FIGS. 5a through 8c a connecting region in the form of a first connecting region 41 is so designed that the hinge joint connection 5, in addition to the pivotal movement of a usual hinge joint connection about the first pivot axis s1, here permits two further relative movements of the joint partners 51, that is to say the hingedly interconnected chain links 3.

The first additional relative movement of the joint partners 51 is a pivotal movement of the joint partners 51 about a second pivot axis s2 which extends in the longitudinal direction. Here, the second additional relative movement of the joint partners 51 is a translation of the joint partners 51 in a translation direction t perpendicular or approximately perpendicular to the pivot axes s1, s2 or in the height direction h. As can be seen from the Figures the translation takes place perpendicularly to the longitudinal direction 1 and the transverse direction q of the chain link 3 or the handling chain 1. Here therefore the hinge joint connection 5 has three degrees of freedom, a pivotal movement about the first pivot axis s1, a pivotal movement about the second pivot axis s2 and a translation movement in the translation direction t. The joint partners 51 of the hinge joint connection 5 are arranged in axially non-displaceable relationship with each other with respect to the first pivot axis s1.

In a readiness position (not shown here), the body 2 of the handling chain 1, as its basic shape, has a flat elongate belt 21 comprising hingedly interconnected chain links 3. The belt 21 has two mutually opposite larger sides perpendicularly to the height direction h, that is to say a first side 22 and a second side 23. In the first embodiment of the handling chain 1 in the form of a transport chain 11 the second side 23 is a carrier for a transport space which however in relation to FIG. 1 can also be arranged laterally of or below the transport chain 11. In FIG. 11 with the second embodiment of the conveyor chain in the form of a guide chain, here an energy guiding chain 12, the second side 23 is provided as the carrier for a guide space 62 for the energy lines. In the position of use shown in FIGS. 1 and 11 the belt is assembled to form an endless belt with its ends being connected to provide the transport belt 11, while the belt 11 for providing the energy guiding chain is respectively fixed at its ends to a connection point (not shown here), the connection points being moveable relative to each other.

The chain links 3 like the belt 21 each have a body 2 having a first side 22 and a second side 23, wherein the two sides 22, 23 are connected together by narrow sides 24 parallel to the longitudinal direction and narrow sides 25 perpendicular to the longitudinal direction. In that case the connecting regions 4 of the chain links 3 are respectively arranged at the perpendicular narrow sides 25, at which the joint partners 51 are connected in the hinge joint connection 5. The chain links each have a first connecting region 41 and a second connecting region 42 spaced in the longitudinal direction from the first connecting region, wherein to provide the hinge connection 5 the first connecting region 41 of the one joint partner 51 is connected to the second connecting region 42 of the other joint partner 51.

Provided in the first connecting region 41 are first projections 43 which have first connecting means 45 while provided in the second connecting region 42 are second projections 44 having second connecting means 46, the projections 43, 44 respectively extending away in the longitudinal direction, more specifically away from each other. The projections 43, 44 of the joint partners 51 engage tooth-like into each other in alternate sequence. In the embodiments shown here of the chain links 3 there are three first projections 44 and four second projections 44, wherein a 3first projection 43 is respectively flanked by two second projections 44 and bears in axially non-displaceable relationship against same with respect to the first pivot axis s1.

Provided at the first projections 43 as the first connecting means 45 is a respective sliding guide means 52 designed for a purely linear translation of the two joint partners 51 relative to each other. The sliding guide means 52 forms a first hinge opening 53, the first hinge opening 53 extending axially in the direction of the first pivot axis s1 associated therewith. The sliding guide means 52 has a slot profile extending over a length 1 in the height direction. In the embodiment of the chain link 3 as shown here that slot profile is of an opened configuration in the direction of the surface normal of the second side 23, providing a C-shaped profile, wherein the limbs of the C-shaped profile extend parallel and in the height direction h. Provided laterally between the second projections 44 as second connecting means 46 are pins 55 which engage into the first hinge opening 53 of the joint partner 51 to provide the hinge joint connection 5. In a neutral position in which the sides 22, 23 of the joint partners 51 are in mutual alignment the pin 51 is arranged at halfway along the length 1 of the slot profile in the first hinge opening 53.

Corresponding assembly for making the connection of two joint partners 51 is shown in FIGS. 4a through 6d in three steps. As the first hinge opening 53 is open in the height direction h of the respective joint partner 51 the joint partners 51 are moved above each other and brought into engagement in a joining position (FIGS. 4a through 4c) in which the joint partners 51 are positioned at an angle of around 90°, with lateral engagement of the pin 55 into the C-shaped profile of the first hinge opening 53 (see FIGS. 5a through 5c). For easier engagement of the pin 55 into the first hinge opening 53 it is of an enlarged configuration in a funnel-like shape towards the edge of the opening (FIGS. 4c and 15c). The joint partners 51 are then pivoted out of the joining position into a working position in which the joint partners are positioned at an angle markedly greater than 90°, here as shown in FIG. 8a at an angle somewhat larger than 180°. That position approximately corresponds to an abutment-delimited flexural position of the handling chain 1 in its arc 13. For that purpose, provided at the ends in the connecting regions 41, 42 are abutments 14 (FIG. 6c) which are guided with pivotal movement of the joint partners 51 about the first pivot axis s1 against each other.

To prevent the joint partners 51 detaching from each other again in the working position, there is provided a blocking device 7 which in particular in the energy guiding chain 12 is used in its first embodiment in a duplicate embodiment. In both embodiments of the chain 1 there is provided a first embodiment of the blocking device 7 which has in the first connecting region 41 a blocking projection 71 engaging into a blocking opening 72 provided in the second connecting region 42. The blocking opening 72 is of a laterally opened configuration towards the second side 23 so that the blocking projection 71 can slide unimpededly into the blocking opening 72 upon assembly of the joint partners 51 (FIG. 6c). In the direction from the second side 23 towards the first side 22 however the blocking opening 72 has a lateral wall 73 which opposes movement of the chain link 3 with the blocking projection 71 in that direction and thus serves as an abutment to prevent axial displacement of the joint partner 51 with the first hinge opening 53 in the direction of the surface normal of the first side 22. In that way the two joint partners 51 can admittedly be reciprocated in the working position over a given distance, here over the length 1 of the C-shaped profile, but not beyond same. Accordingly, the joint partners 51 can be displaced relative to each other in the translation direction t. This embodiment of the blocking device 7 with blocking projections 71 and blocking opening 72 is provided here in duplicate, more specifically at the end with respect to the transverse direction q at the respective parallel narrow sides 24.

In order to counteract possible enlargement of the C-shaped profile, that is radial with respect to the first pivot axis s1, under the loading in the handling chain 1, there is provided a reinforcement means 8 which here is in the form of a reinforcement wall 81 arranged perpendicularly to the first pivot axis s. Here the reinforcement wall 81 extends over the entire cross-section of the C-shaped profile and is connected to same. In that way the first hinge opening 53 is divided into here two identical portions. The arrangement of the reinforcement wall 81 requires the pin 55 to be divided in the second connecting region 42 into two pin portions 56. Those two pin portions 56 respectively extend with a free end axially towards each other, with respect to the first pivot axis s1, delimiting an intermediate space 57, wherein the reinforcement wall 81 engages into that intermediate space with engagement of the pin 55 into the first hinge opening 53. The intermediate space 57 is of an axial size with respect to the first pivot axis s1 that is equal to that of the reinforcement wall 81.

FIGS. 7a through 10d and here in particular the cross-sectional views in FIGS. 7c through 10c show four possible maximum relative positions, corresponding to the selected dimensions of the joint partners, of the joint partners 51 connected by the hinge joint connection 5, more specifically using the example of three interconnected chain links 3, wherein the relative positions relate to a neutral position in which the joint partners are unpivoted with respect to the second pivot axis and unmoved in respect of translation. It is apparent from the views that the maximum relative positions respectively substantially depend on the length la of the slot profile of the first hinge openings or can be adjusted by way of that length la.

Referring to FIGS. 7a through 7c shown there is a first relative position of the joint partners 51, that occurs due to pure pivotal movement about the second pivot axis s2 and more specifically, with the left chain link fixed, upon pivotal movement of the right chain link 3 in the counter-clockwise direction by an amount a. This means that, with structurally identical chain links 3, the maximum pivotal movement of two joint partners 51 is of an amount of a/2. The pivotal movement in itself about the second pivot axis s2 is clearly visible in FIG. 7c from the change in the relative position of the reinforcement walls 81 relative to the respectively associated pin 55, wherein the reinforcement walls 81 move stepwise downwardly in a sequence from left to right from left in the intermediate space 57. Referring to FIGS. 8a through 8c with a second relative position the pivotal movement took place about the second pivot axis s2 in the clockwise direction with the same amounts a as in FIGS. 7a through 7c.

Referring to FIGS. 9a through 9d the third relative position is shown therein, produced by translation in the translation direction t, wherein, with the left chain link held fast, the translation movement occurs with a stepwise lift in the chain links 3 at the right in relation thereto by the amount a/2, that is to say in total by the amount a. It is possible to clearly see the upward movement in FIG. 9d. Because of the pure translation movement, the reinforcement walls 81 of a chain link 3 are moved in the same manner relative to the adjacent pins 55. Referring to FIGS. 10a through 10d showing the fourth relative position, that position, with the left chain link 3 held fast, is implemented by translation with downward movement of the chain links 3 to the right thereof by the same amounts a as in FIGS. 7a through 7c.

Figure 12:
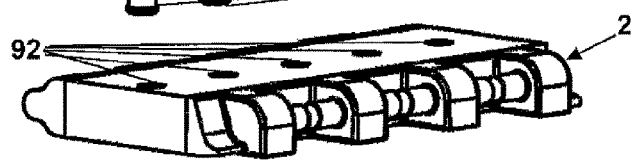
FIG. 12 shows a perspective view of the handling chain of FIG. 11 prior to assembly of the holding means therewith.

As can be seen from FIG. 11 with the view of the energy guiding chain 12, provided at the second side 23 here of each chain link 3 are loop-shaped holding means 9 which delimit the guide space 62 and which after assembly of the joint partners 51 can be fixed thereon here in the form of a plug-in connection. For that purpose, plug-in projections 91 are provided at the underside of the holding means 9, the projections engaging into associated plug-in openings 92 provided at the second side to form the plug-in connection (FIG. 12). Those holding means 9 at the same time form a second embodiment of the blocking device 7: if the joint partners 51 connected in the hinge joint connection 3 are pivoted out of the working position about the first pivot axis s1 back in the direction of the joining position, that is to say in FIG. 11 in opposite relationship to the curve of the arc 13, then the holding means 9 arranged at the second side 23 are pivoted relative to each other and, when a given pivotal angle is reached, butt laterally against each other. Thus, a given pivotal angle can be set by way of the dimensioning of the holding means 9 and by way of whether each chain link 3 or only each x-th chain link 3, like a second or a third chain link 3, is provided with the holding means, insofar as the holding means 9 laterally butt against each other and thus block further pivotal movement. By virtue of that arrangement a handling chain 1 which is made up in that way can be stored in completely pre-assembled condition without the risk of the chain links 3 unintentionally becoming detached again.

As can be seen from FIGS. 2b and 12 the bodies 2 of the two embodiments of the handling chain 1 are the same except for the plug-in openings 92 of the energy guiding chain 12, in which respect those can also be provided in the transport chain 11. In addition, a longitudinal slit for inserting energy lines can be provided at the side of the holding means, that is remote from the body 2. The same holding means can also be provided to delimit the transport space of the conveyor chain, for example to arrange the material being transported in protected relationship and possibly also in a condition of being clamped by the holding means.

An embodiment of the handling chain which is not shown but which is also included in the scope of the invention, is one in which the first hinge opening has a closed slot profile and the second connecting means is in the form of a second hinge opening with a preferably circular opening profile. To provide the hinge connection between two joint partners, the hinge openings of the joint partners are arranged in mutually aligned relationship and are held in a connected position with a hinge pin extending therethrough. This embodiment is admittedly of a structurally simpler configuration in comparison with the above-discussed embodiment of the handling chain 1, but to provide the hinge joint connection it requires the hinge pin which has to be additionally fitted.

LIST OF REFERENCES 1 handling chain
11 transport chain
12 energy guiding chain
13 arc
2 body
21 belt
22 first side
23 second side
24 parallel narrow side
25 perpendicular narrow side
3 chain link
4 connecting region
41 first connecting region
42 second connecting region
43 first projection
44 second projection
45 first connecting means
46 second connecting means
5 hinge joint connection
51 joint partner
52 sliding guide means
53 first hinge opening
55 pin
56 pin portions
57 intermediate space
59 abutment
61 transport space
62 guide space
7 blocking device
71 blocking projection
72 blocking opening
73 wall
8 reinforcement means
81 reinforcement wall
9 holding means
91 plug-in projection
92 plug-in opening
93 slit
a amount
l longitudinal direction
la length
h height direction
q transverse direction
s1 first pivot axis
s2 second pivot axis
t translation direction
G item
S stamp
W tool

The invention claimed is:

1. A chain link for a handling chain, wherein the handling chain has a body comprising a plurality of chain links with adjoining chain links each providing a respective joint partner which adjoin each other in a longitudinal direction (l) of the handling chain and are connected together pivotably about a respective first pivot axis (s1) which extends in a transverse direction (q) which is transverse to the longitudinal direction (l) of the handling chain, the chain link comprising:

wherein the chain link has a first connecting region configured to form a first pivotal connection in a form of a first hinge joint connection with the respective joint partner, which permits pivoting about the first pivot axis (s1) and at least one additional relative movement of the joint partners,
wherein the at least one additional relative movement of the joint partners of the first hinge joint connection is in a form of a pivotal movement about a second pivot axis (s2) extending in the longitudinal direction (l) of the handling chain and in a form of a translation in a height direction (h) which extends transverse to the longitudinal direction (l) of the handling chain and the transverse direction (q).

2. The chain link as set forth in claim 1, wherein the first connecting region has a sliding guide means for guiding assembly of the joint partners.

3. The chain link as set forth in claim 1, wherein the first connecting region comprises a first connecting means, the first connecting means comprising a first hinge opening which is axial with respect to the first pivot axis (s1).

4. The chain link as set forth in claim 3, wherein the first hinge opening comprises a slot profile, the slot profile being a C-shaped profile which opens in the height direction (h) perpendicularly with respect to the first pivot axis (s1).

5. The chain link as set forth in claim 4, wherein the first connecting region comprises a reinforcement wall to stabilize the C-shaped profile against enlargement which is radial with respect to the first pivot axis (s1).

6. The chain link as set forth in claim 1, wherein the chain link has a second connecting region spaced from the first connecting region in the longitudinal direction (l) of the handling chain,
wherein the second connecting region is configured to form a second pivotal connection in a form of a second hinge joint connection with a further respective joint partner, which permits pivoting about a further first pivot axis (s1) and at least one further additional relative movement of the further joint partners, and
wherein the further additional relative movement of the further joint partners of the second hinge joint connection is in a form of a pivotal movement about the second pivot axis (s2) and/or in a form of a translation in the height direction (d).

7. The chain link as set forth in claim 6, wherein the second connecting region comprises a second connecting means, the second connecting means comprising a second hinge opening which is axial with respect to the further first pivot axis (s1) or a pivot pin which is axial with respect to the further first pivot axis (s1).

8. The chain link as set forth in claim 1, wherein the chain link comprises a second connecting region spaced from the first connecting region in the longitudinal direction (l) of the handling chain,
wherein the second connecting region comprises second connecting means,
wherein the second connecting means comprises at least one second projection of the second connecting region extending in the longitudinal direction (l) of the handling chain,
wherein the first connecting region comprises a first connecting means, and
wherein the first connecting means comprises at least one first projection of the first connecting region extending in the longitudinal direction (l) of the handling chain.

9. The chain link as set forth in claim 8, wherein the first connecting means comprises at least two first projections of the first connecting region extending in the longitudinal direction (l) of the handling chain, and wherein the second connecting means comprises at least three second projections of the second connecting region extending in the longitudinal direction (l) of the handling chain.

10. A chain link for a handling chain, wherein the handling chain has a body comprising a plurality of chain links with adjoining chain links each providing a respective joint partner which adjoin each other in a longitudinal direction (l) of the handling chain and are connected together pivotably about a respective first pivot axis (s1) which extends in a transverse direction (q) which is transverse to the longitudinal direction (l) of the handling chain, the chain link comprising:
a first connecting region of the chain link configured to form a hinge joint connection with a second connecting region of a first adjoining chain link to pivot the chain link and the first adjoining chain link about the respective first pivot axis (s1),
a second connecting region of the chain link configured to form another hinge joint connection with a first connecting region of a second adjoining chain link to pivot the chain link and the second adjoining chain link about the respective first pivot axis (s1),
a plate-like body having a first side, a second side and narrow sides connecting the first side and the second side, the narrow sides perpendicular to the longitudinal direction (l),
the first connecting region of the chain link arranged at one of the narrow sides, and the second connecting region of the chain link arranged at another of the narrow sides,
the first connecting region of the chain link comprising at least one hinge opening which is axial to the respective first pivot axis (s1) with an uncurved slot profile, wherein the slot profile extends in a height direction (h) which is perpendicular to the longitudinal direction (l) and the transverse direction (q), and is open towards the second side,
the second connecting region of the chain link comprising at least one hinge pin of circular cross section which is axial to the respective first pivot axis (s1) and configured to engage into a hinge opening of the first connecting region of the second adjoining chain link,
a blocking device of the chain link arranged separately from the at least one hinge opening of the first connecting region of the chain link and the at least one hinge pin of the second connecting region of the chain link,
the blocking device comprising a blocking projection disposed in the first connecting region of the chain link and a blocking opening disposed in the second connecting region of the chain link,
the blocking projection of the chain link configured to engage into a blocking opening disposed in the second connecting region of the first adjoining chain link, and
the blocking opening of the chain link is of a laterally opened configuration towards the second side of the chain link, and has a lateral wall which opposes movement of a blocking projection of the second adjoining chain link in a direction of a surface normal of the first side.

11. The chain link as set forth in claim 10, wherein the blocking projection of the chain link is disposed at one end of the chain link with respect to the transverse direction (q), and the blocking opening of the chain link is disposed at another end of the chain link with respect to the transverse direction (q).

12. The chain link as set forth in claim 10, wherein the slot profile of the at least one hinge opening of the chain link has a C-shaped profile which opens in the height direction (h) perpendicular with respect to the longitudinal direction (l) and the transverse direction (q).

13. The chain link as set forth in claim 12, wherein the first connecting region of the chain link comprises a reinforcement wall to stabilize the C-shaped profile against enlargement which is radial with respect to the first pivot axis (s1).

14. The chain link as set forth in claim 10, wherein the first connecting region of the chain link comprises at least one first projection extending in the longitudinal direction (l) and including the at least one hinge opening, and wherein the second connecting region of the chain link comprises at least one second projection extending in the longitudinal direction (l) and including the at least one hinge pin.

15. The chain link as set forth in claim 10, wherein the first connecting region of the chain link comprises a plurality of hinge openings which are each axial to the respective first pivot axis (s1) with an uncurved slot profile, wherein the slot profile of each hinge opening extends in a height direction (h) which is perpendicular to the longitudinal direction (l) and the transverse direction (q), and is open towards the second side,
wherein the second connecting region of the chain link comprising a plurality of hinge pins of circular cross section which are each axial to the respective first pivot axis (s1) and configured to engage into a hinge opening of the first connecting region of the second adjoining chain link, respectively,
wherein the first connecting region of the chain link comprises at least two first projections extending in the longitudinal direction (l) and each of the at least two first projections includes at least one of the plurality of hinge openings, and
wherein the second connecting region of the chain link comprises at least three second projections extending in the longitudinal direction (l) and each of the at least three second projections includes at least one of the plurality of hinge pins.

16. The chain link as set forth in claim 10, wherein the first connecting region of the chain link comprises a plurality of hinge openings which are each axial to the respective first pivot axis (s1) with an uncurved slot profile, wherein the slot profile of each hinge opening extends in a height direction (h) which is perpendicular to the longitudinal direction (l) and the transverse direction (q), and is open towards the second side,
wherein the second connecting region of the chain link comprising a plurality of hinge pins of circular cross section which are each axial to the respective first pivot axis (s1) and configured to engage into a hinge opening of the first connecting region of the second adjoining chain link, respectively,
wherein the first connecting region of the chain link comprises at least two first projections extending in the longitudinal direction (l) and each of the at least two first projections includes at least two of the plurality of hinge openings, and
wherein the second connecting region of the chain link comprises at least three second projections extending in the longitudinal direction (l) and each of the at least three second projections includes at least two of the plurality of hinge pins.

17. A handling chain, comprising:
a body comprising a plurality of chain links with adjoining chain links each providing a respective joint partner which adjoin each other in a longitudinal direction (l) of the handling chain and are connected together pivotably about a respective first pivot axis (s1) which extends in a transverse direction (q) which is transverse to the longitudinal direction (l) of the handling chain,
wherein at least one chain link of the plurality of chain links has
a first connecting region of the chain link configured to form a hinge joint connection with a second connecting region of a first adjoining chain link to pivot the chain link and the first adjoining chain link about the respective first pivot axis (s1),
a second connecting region of the chain link configured to form another hinge joint connection with a first connecting region of a second adjoining chain link to pivot the chain link and the second adjoining chain link about the respective first pivot axis (s1),
a plate-like body having a first side, a second side and narrow sides connecting the first side and the second side, the narrow sides perpendicular to the longitudinal direction (l),
the first connecting region of the chain link arranged at one of the narrow sides, and the second connecting region of the chain link arranged at another of the narrow sides,
the first connecting region of the chain link comprising at least one hinge opening which is axial to the respective first pivot axis (s1) with an uncurved slot profile, wherein the slot profile extends in a height direction (h) which is perpendicular to the longitudinal direction (l) and the transverse direction (q), and is open towards the second side,
the second connecting region of the chain link comprising at least one hinge pin of circular cross section which is axial to the respective first pivot axis (s1) and configured to engage into a hinge opening of the first connecting region of the second adjoining chain link,
a blocking device of the chain link arranged separately from the at least one hinge opening of the first connecting region of the chain link and the at least one hinge pin of the second connecting region of the chain link,
the blocking device comprising a blocking projection disposed in the first connecting region of the chain link and a blocking opening disposed in the second connecting region of the chain link,
the blocking projection of the chain link configured to engage into a blocking opening disposed in the second connecting region of the first adjoining chain link, and
the blocking opening of the chain link is of a laterally opened configuration towards the second side of the chain link, and has a lateral wall which opposes movement of a blocking projection of the second adjoining chain link in a direction of a surface normal of the first side.

18. The handling chain as set forth in claim 17, wherein the handling chain is a conveyor chain or a guide chain.

* * * * *